Oct. 22, 1957
R. C. BAKER
2,810,441
APPARATUS FOR TESTING TUBING AND FOR SETTING SUBSURFACE WELL DEVICES
Filed Nov. 24, 1953
3 Sheets-Sheet 1
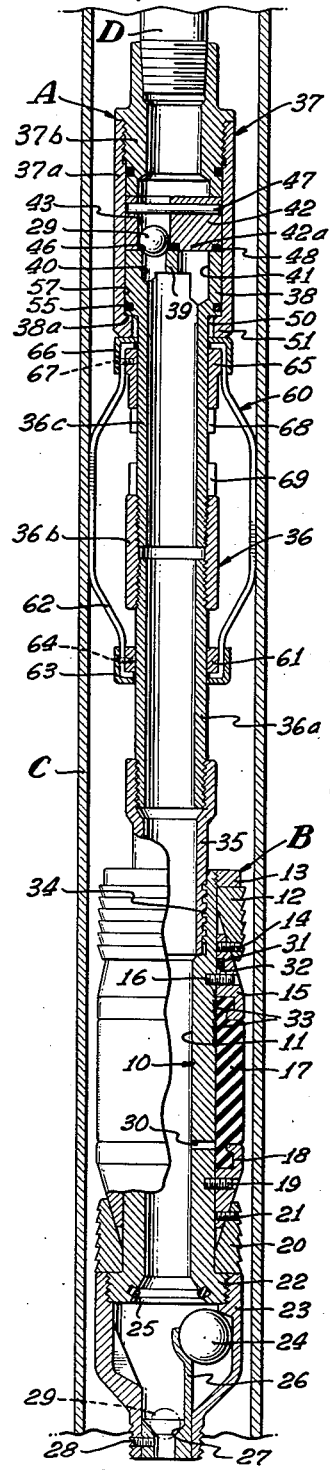
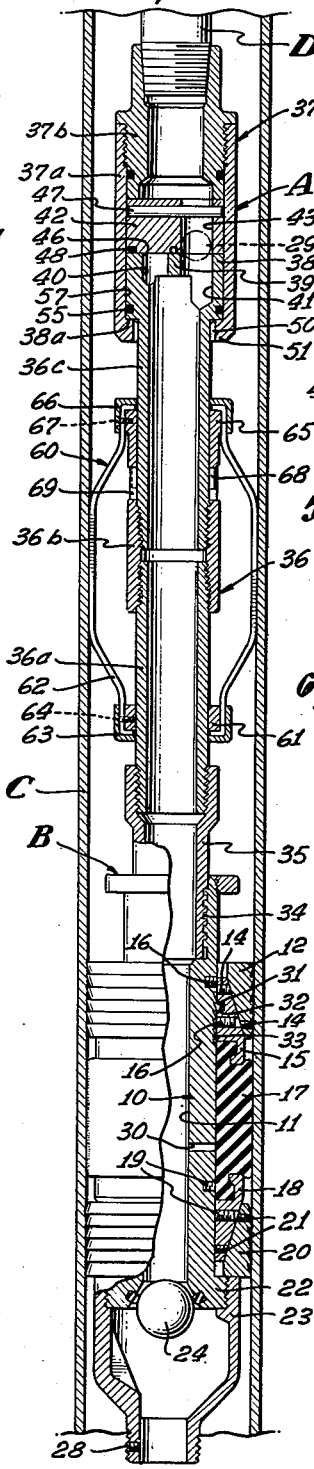
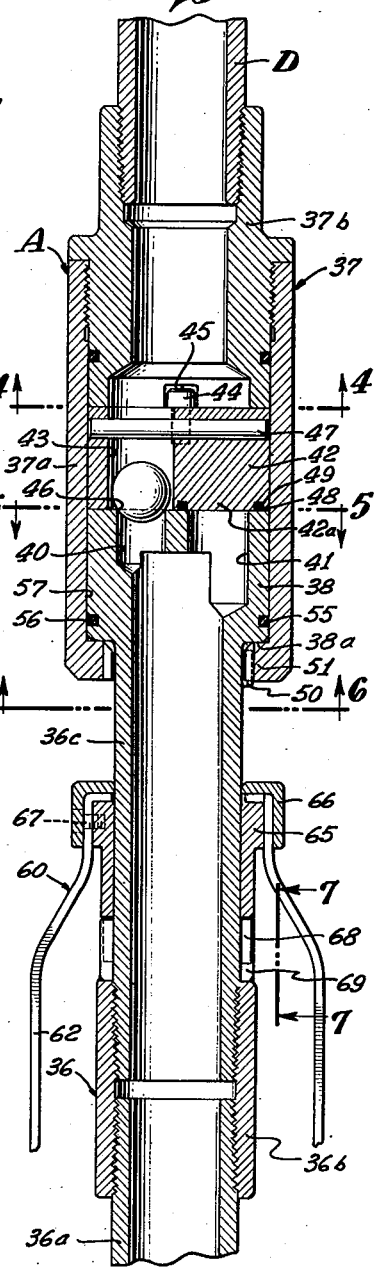
INVENTOR.
REUBEN C. BAKER,
BY
Mellin and Hanscom
ATTORNEYS

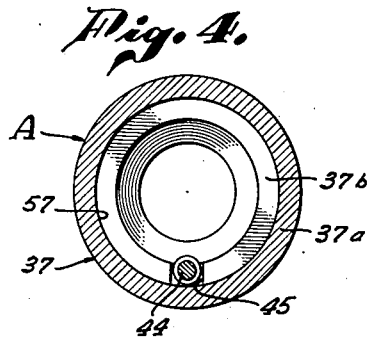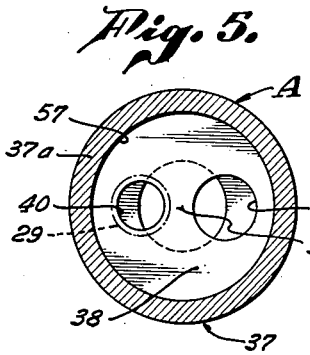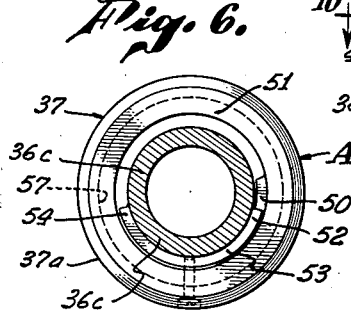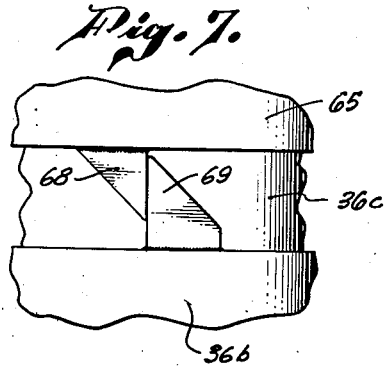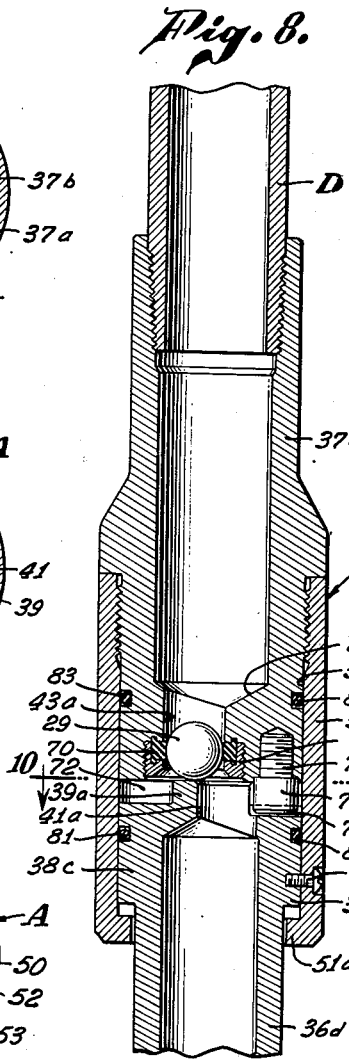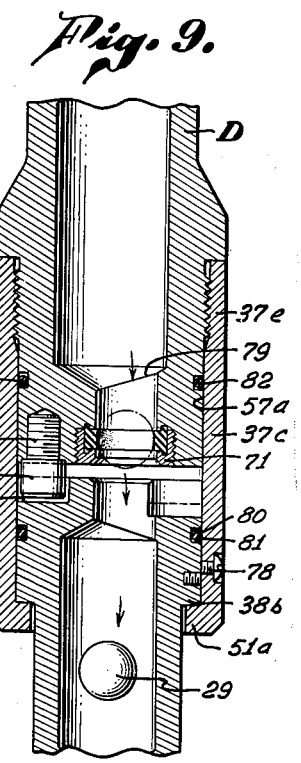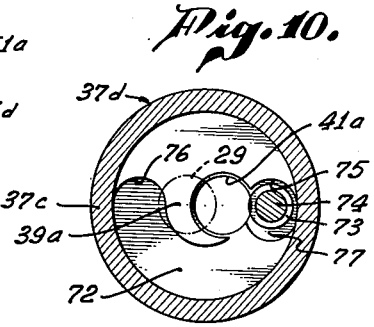

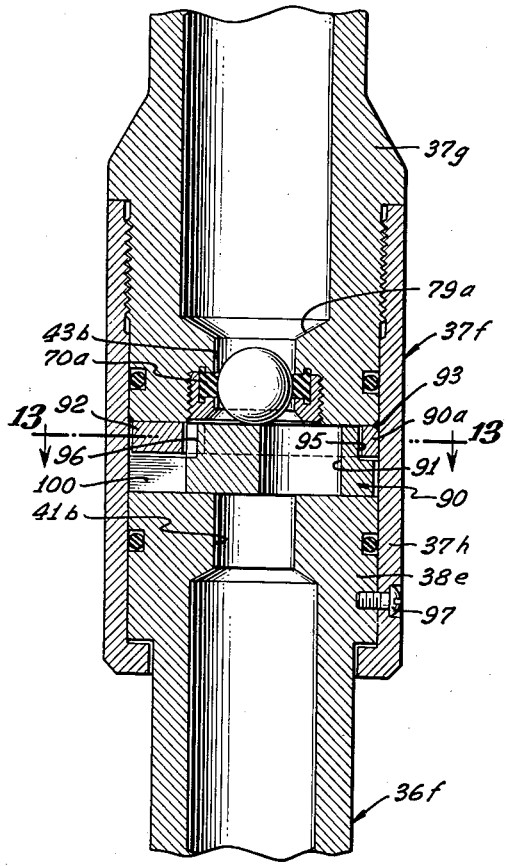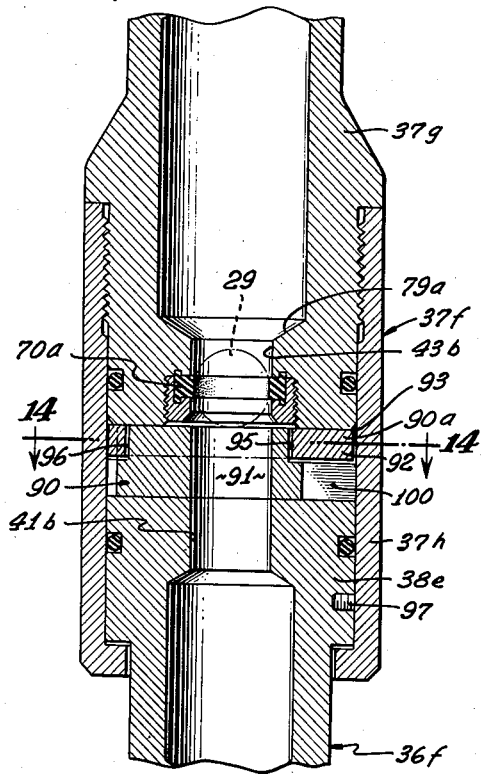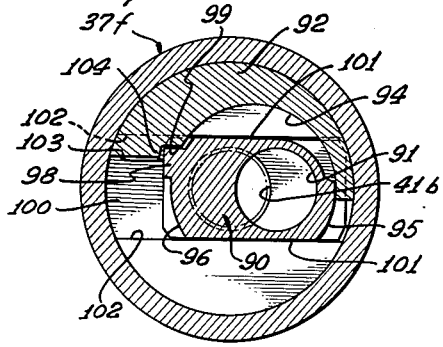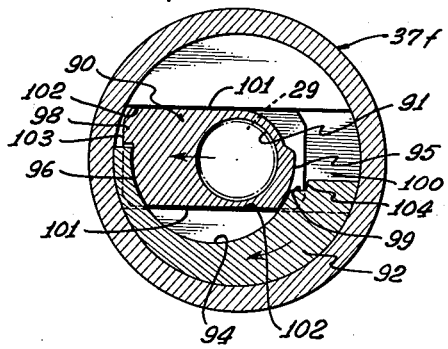
INVENTOR.
REUBEN C. BAKER,
BY
Meelin and Hanscom
ATTORNEYS

United States Patent Office 2,810,441
Patented Oct. 22, 1957

2,810,441

APPARATUS FOR TESTING TUBING AND FOR SETTING SUBSURFACE WELL DEVICES

Reuben C. Baker, Coalinga, Calif., assignor to Baker Oil Tools, Inc., Los Angeles, Calif., a corporation of California Application November 24, 1953, Serial No. 394,112

18 Claims. (Cl. 166—124)

The present invention relates to subsurface well apparatus, and more particularly to well apparatus adapted to be lowered in a well bore on a tubular string.

An object of the present invention is to provide an improved apparatus for testing a tubular string for leaks after the tubular string has been lowered in a well bore.

Another object of the invention is to provide an apparatus for pressure testing tubular strings in well bores, in which the well bore fluid is allowed to fill the tubular string as the latter is lowered in the well bore, but in which downward flow of fluid through the tubular string is prevented until desired.

A further object of the invention is to provide apparatus for pressure testing tubular strings in well bores, embodying a closure member for preventing downward flow of fluid through the tubular string, the closure member being releasable at will for downward passage into cooperation with another well device secured to the tubular string, to enable the well device to be operated.

Yet another object of the invention is to provide a valve device in a tubular string that allows fluid to pass upwardly in the tubular string during its lowering in a well bore, but precludes downward flow of fluid therethrough to allow the tubular string to be pressure tested, the valve device being ejectable whenever desired to allow downward flow of fluid in the tubular string.

Still a further object of the invention is to provide a valve device in a tubular string that prevents fluid from moving down the tubular string, to allow the latter to be pressure tested, the valve device being rendered inoperative whenever desired to allow fluid to be pumped down the tubular string.

This invention possesses many other advantages and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a longitudinal section of an embodiment of the invention disposed in a well casing, with certain parts in position for pressure testing a tubular string to which the apparatus is secured;

Fig. 2 is a view similar to Fig. 1, with parts of the apparatus disclosed in another relative position;

Fig. 3 is a longitudinal section, on an enlarged scale, of a portion of the apparatus disclosed in Fig. 1;

Fig. 4 is a cross-section taken along the line 4—4 on Fig. 3;

Fig. 5 is a cross-section taken along the line 5—5 on Fig. 3;

Fig. 6 is a cross-section taken along the line 6—6 on Fig. 3;

Fig. 7 is a fragmentary side elevation, on an enlarged scale, taken as indicated by the line 7—7 on Fig. 3;

Fig. 8 is a longitudinal section through another embodiment of the invention, with the valve device in position for pressure testing the tubular string to which the device is attached;

Fig. 9 is a view similar to Fig. 8, disclosing the valve device in an ineffective position;

Fig. 10 is a cross-section taken along the line 10—10 on Fig. 8;

Fig. 11 is a longitudinal section of still another embodiment of the invention, with the valve portion of the device in position for pressure testing a tubular string;

Fig. 12 is a view similar to Fig. 11, with the parts disclosed in another relative position, in which the valve device is open;

Fig. 13 is a cross-section taken along line 13—13 on Fig. 11;

Fig. 14 is a cross-section taken along the line 14—14 on Fig. 12.

In general, it is desired to pressure test a tubular string that is disposed in a well bore, or in well casing positioned in the well bore, by preventing downward passage of fluid through the tubular string. After the testing operation has been performed, the tubular string is readily opened, to allow fluid to be pumped down the tubular string.

As disclosed in the form of invention illustrated in Figs. 1 to 7, inclusive, a tubing string testing apparatus A is disposed in connection with a well packer B, which is to be set in a well casing C. The combination of apparatus is lowered in the well casing to the desired setting point on a tubular string D that may be made up of connected sections of tubing or drill pipe.

The well packer is of a known type, the details of which may be found in United States Patent No. 2,204,648. In general, it includes a tubular body 10 having a central passage 11 therethrough. A set of upper segmental slips 12 is disposed around the body below an abutment 13 secured to the upper end of the body. These slips are connected by shear screws 14 to an upper expander 15 which is releasably connected to the body by one or more shear screws 16. A packing sleeve 17, of rubber or rubber-like material, surrounds the body 10, its upper end being secured to the upper expander 15 and its lower end to a lower expander 18 initially secured to the body 10 by shear screws 19. This lower expander is engaged by a lower set of segmental slips 20, the lower slips being secured to the lower expander by one or more shear screws 21. The lower slips rest upon a lower flange or body abutment 22, and also upon the upper end of a valve housing 23 threadedly secured to the body.

A back pressure valve element 24, which may be in the form of a ball, is disposed in the valve housing 23, being movable upwardly into engagement with a companion valve seat 25 at the lower portion of the body 10, to prevent upward passage of fluid through the body passage 11. Initially, this valve element 24 is prevented from engaging its companion seat 25 by a holding arm 26 extending upwardly from a trip ball seat 27 secured in the lower portion of the valve housing 23 by a shear screw 28. This trip ball seat is adapted to be engaged by a trip ball 29, to prevent downward passage of fluid through the body 10, to allow fluid pressure to be built up in the body, this pressure passing outwardly through one or more lateral ports 30 in the body opening into the interior of the packing sleeve 17. As explained in the above-identified patent, the application of pressure to the packing sleeve will inflate it against the well casing C and cause it to stretch upwardly, shearing the upper expander screws 16 and upper slip screws 14, the upper expander 15 sliding upwardly on the body to expand the upper slips 12 laterally outward into anchoring engagement with the well casing C. Thereafter, the tubular string D may be elevated, to raise the body 10, the lower expander 18 being moved toward the upper expander 15, foreshortening the packing sleeve 17 and expanding it laterally outward into sealing engagement with the wall of the well casing. After this occurs, a continuation of the upward strain on the tubing string D and body 10 will shear the lower expander screws 19 and lower slip screws 21, causing the lower abutment 22 and valve housing 23 to shift the lower slips 20 upwardly along the lower expander 18 and into firm anchoring engagement with the wall of the well casing. The upper and lower slips 12, 20 and packing sleeve 17 will remain in their outward expanded positions, their return movement to retracted positions being prevented by a suitable split ratchet ring 31 disposed in a groove 32 in the upper expander 15 engageable with downwardly facing ratchet teeth 33 provided on the exterior of the body 10 of the well packer B (Fig. 2).

The well packer B is detachably secured to the tubular string D and tester A by means of a left-hand threaded connection 34 provided between the upper end of the body 10 and a sub 35 threaded thereinto. The upper end of this sub is threaded onto the lower portion of a lower tubular member 36, which is received or piloted within an upper tubular member 37 secured to the tubular string D. The upper and lower tubular members 36, 37 form part of the tubing tester, and also form part of a device for allowing the trip ball 29 to move downwardly into engagement with the trip ball seat 27, whenever the well packer B is to be anchored in packed-off condition within the well casing C. As specifically shown, the lower portion 36a of the lower tubular member 36 is threaded into a coupling 36b threadedly attached to an upper tubular portion 36c having an upper head 38 received within a lower housing portion 37a of the upper tubular member 37. This lower housing portion is threadedly secured to an upper housing portion 37b that is, in turn, threadedly attached to the lower end of a tubing section D thereabove. The head 38 of the lower member 36 is provided with a transverse wall 39 having a pair of longitudinally extending passages 40, 41 that are disposed eccentrically of the axis of the lower tubular member 36. As a matter of fact, the passages 40, 41 are displaced 180 degrees from each other. These passages are selectively open or closed, in order to operate the mechanism, as described hereinafter.

Located in the housing 37a and bearing upon the upper end of the head 38 is a closure or block member 42 having a passage 43 therethrough disposed to one side of the axis of the block and the apparatus itself. This block 42 is adapted to be angularly moved with the housing 37a with respect to the lower tubular member 36 and its passages 40, 41 by coupling it to the lower end of the upper housing portion 37b. As specifically disclosed, a cap screw or coupling pin 44 is threaded into the upper end of the block 42, being received within a slot 45 extending through the wall of the upper housing portion 37b.

The block 42 is rotatable with the housing 37 to dispose its passage 43 selectively in alignment with each of the head passages 40, 41. The block passage 43 contains a valve element, in the form of the ball trip 29, which has a diameter greater than one of the head passages 40, so as to move downwardly into engagement with a seat 46 provided in the head around the passage 40, to prevent downward flow of fluid from the tubular string D, through the housing 37 and into the lower tubular member 36. This ball 29, however, can move in an upward direction, to allow fluid to flow upwardly through the lower tubular member 36 through the passage 40 and around the ball 29 passing through the block passage 43 and into the upper housing portion 37b and tubular string D. Loss of the ball is prevented by providing a retaining pin 47 in the block 42 extending across the upper portion of the passage 43.

When the block 42 is located in a position in which its passage 43 is in alignment with the passage 40 having a smaller diameter than the ball, an imperforate portion 42a of the block is disposed across the upper end of the other passage 41, which has a greater diameter than the diameter of the ball 29. To insure that fluid will not pass in a downward direction through this passage 41 of greater diameter, the lower end 42a of the block may be provided with a suitable gasket ring 48 in a circular groove 49 adapted to engage the upper end of the head around the larger diameter passage 41.

As stated above, the block 42 is rotatable with respect to the lower tubular member 36 and its head 38, to align its passage 43 with either the smaller diameter passage 40 or the larger diameter passage 41 in the head. To insure the proper location of the block 42 with respect to the lower tubular member 36 and its head 38, a locating lug 50 is provided on a flange 51 extending inwardly from the lower end of the housing 37, the flange engaging the undersurface 38a of the head 38, to hold the upper and lower tubular members 37, 36 in appropriate assembled relation (Figs. 1, 2, 3, and 6). This lug 50 is engageable with one end 52 of a stop 53 secured to the lower tubular member 36, in which position the block passage 43 is in alignment with the smaller diameter passage 40, or, upon rotation of the housing 37 relative to the lower tubular member 36, the lug 50 is brought into engagement with another end portion 54 of the stop 53, which will locate the ball 29 and the block passage 43 in alignment with the head passage 41 of larger diameter. Since the two passages 40, 41 are approximately 180 degrees apart in the specific design of device shown in the drawings, the housing 37 and block 42 are shiftable 180 degrees with respect to the lower tubular member 36.

Leakage of fluid from the housing 37 is prevented by providing a suitable side seal 55 in a peripheral groove 56 in the head 38 which is engageable with the inner wall 57 of the housing 37a.

In order to effect rotation of the upper housing 37 and the block 42 and valve ball contained therein with respect to the lower tubular member 36 and its head 38, rotation of the lower tubular member 36 is resisted. Inasmuch as the well packer B is initially disengaged from the wall of the well casing C, the well packer, itself, cannot provide the necessary resistance to rotation of the lower tubular member 36. To secure such resistance to turning, a friction drag device 60 is disposed on the lower tubular member 36, this friction drag device consisting of a lower collar 61 slidable on the lower tubular member 36a and having the lower ends of outwardly bowed casing engaging springs 62 secured thereto in any suitable manner, as by means of an encompassing ring 63 attached to the collar by one or more screws 64. The upper ends of the springs 62 are attached to an upper collar 65 slidable on the lower tubular member section 36c in a similar manner, as through use of an upper encompassing ring 66 secured to the upper collar 65 by one or more screws 67.

The friction drag springs 62 can resist rotation of the lower tubular member 36, but it is not desired to allow the drag device to provide such resistance to rotation during the lowering of the apparatus in the well casing, to prevent inadvertent relative rotation between the upper tubular member 37 and the lower tubular member 36. For that reason, the drag device 60 is at first rotationally disconnected from the lower tubular member 36. As disclosed, the upper drag collar 65 has one or more axially extending teeth 68 thereon projecting toward companion teeth 69 on the coupling portion 36b of the lower tubular member 36. During lowering of the apparatus in the well bore, the upper collar 65 remains in the upper position shown in Fig. 1, in which the coupling teeth 68, 69 are disengaged. Accordingly, there is no resistance to rotation offered to the lower tubular member 36. However, when such resistance to rotation is required, the tubular string D need only be elevated to a slight extent to bring the teeth 68, 69 into transverse alignment with each other, whereupon rotation of the tubular string D and upper tubular member 37 will cause corresponding rotation of the lower tubular member 36, due to the friction between the parts, until the teeth 69 on the lower tubular member 36 engage the teeth 68 on the upper drag collar 65, thereby precluding further rotation of the lower member 36 by the drag device 60, which is frictionally engaging the wall of the well casing C. Accordingly the tubular string D can be turned, for the purpose of shifting the block 42 and the ball valve 29 from the position disclosed in Fig. 2, in which the block passage 43 and the ball 29 are placed in alignment with the larger diameter head passage 41, the ball then being allowed to drop through this latter passage and into the central passage through the lower tubular member 36.

In the use of the apparatus disclosed in Figs. 1 to 7, inclusive, the parts are first arranged to occupy the positions shown in Fig. 1, in which the housing lug 50 is engaging the stop end on the lower tubular member 36 to locate the inlet passage 43 and ball 29 disposed therein in alignment with the smaller diameter head passage 40. The apparatus is lowered through the fluid in the well casing, such fluid passing upwardly through the packer body 10 and lower tubular member 36, to elevate the ball 29 from its seat 46, the fluid flowing around this ball and into the block passage 43, from where it will flow upwardly through the upper housing portion 37b and into the tubular string D. The other head passage 41 is, at this time, closed by the imperforate portion 42a of the block 42, the gasket 48 on the latter member engaging the upper end of the lower tubular member head 38.

The apparatus is lowered in the well casing C by adding additional sections of tubing to the tubular string D at the top of the well bore. At any time that it is desired to apply pressure to the fluid in the tubular string, to be assured that it contains no leaks, it is merely necessary to subject the fluid in the tubular string D to pressure, such downwardly acting pressure forcing the ball 29 against its companion seat 46 to prevent flow of fluid in a downward direction through the smaller diameter head passage 40 and into the lower tubular member 36. The imperforate portion 42a of the block 42 and the gasket seal 48 are also preventing downward flow of fluid through the larger diameter passage 41. Accordingly, the testing device is closed completely against downward passage of fluid, enabling the operator to determine whether or not a leaky condition is present in the tubular string D.

During lowering of the tubular string, the pressure testing operation can be performed as often as desired. Whenever the downward pressure is imposed, the ball valve element 29 will engage its seat 46. However, during lowering of the apparatus in the well casing, the fluid can disengage the ball 29 from its seat 46, to allow the tubular string to fill automatically with the fluid in the well bore.

While the apparatus is being lowered in the well casing, the drag device 60 is disposed in an upward position along the lower tubular member 36, as determined by engagement of the upper portion of the drag device with the housing flange 51, to insure the disengagement between the coupling teeth 68, 69, in order that the drag device will not inadvertently resist rotation of the lower tubular member 36. When the point in the well casing C is reached at which the well packer B is to be set, it is merely necessary to elevate the tubing string D a slight distance, to bring the teeth 69 of the lower tubular member into transverse alignment with the teeth 68 of the drag device 60, whereupon the tubular string D can be turned, as to the right, the drag device resisting and preventing rotation of the lower tubular member 36 and allowing the upper tubular member 37 and the block 42 and the ball 29 contained therein to be turned with respect to the lower tubular member 36, the extent of turning being limited by the engagement of the lug 50 with the other end 54 of the lower member stop 53. When such engagement occurs, the block passage 43 and ball 29 are in alignment with the larger head passage 41. With such alignment, the ball 29 can drop through the passage 41 into the lower tubular member 36, gravitating through the latter and the packer body 10 into engagement with the trip ball seat 27.

The application of pressure to the fluid in the tubular string D will now cause the packing sleeve 17 to be inflated and elongated, to set the upper slips 12 against the casing, as described above in the above-identified patent, the tubular string D then being elevated to complete the anchoring in packed-off condition of the well packer B in the well casing C. After this has occurred, the pressure of the fluid in the tubular string D and well packer B can be increased to a further extent, to disrupt the shear screw 28 holding the trip ball seat 27 to the housing 23, ejecting the trip ball seat 27 and trip ball 29 from the latter. Such ejection frees the back pressure ball valve 24 and allows it to move upwardly into engagement with its companion body seat 25, to prevent return flow of fluid upwardly through the packer body 10.

The passage through the tubing tester A is now open, in view of the ejection of the ball valve element 29, which then allows fluid to be pumped down through the tubular string D, tubing tester A, and packer body 10, for outward passage from the valve housing 23. For that matter, cement slurry may also be pumped down through the tubular string D and the apparatus A attached thereto for outward passage from the lower end of the well packer B.

After the operation in the well bore has been completed, the tubing string D may be rotated to the right, to disconnect the sub 35 from the body 10 at the left-hand threaded connection 34. The rotation of the tubular string D is transmitted to the upper tubular member 37 and from the driving lug 50 on the latter to the lower tubular member 36. When sufficient torque is applied, the friction force of the springs 62 against the wall of the well casing C is overcome, to allow the lower tubular member 36 and sub 35 to be rotated a sufficient number of revolutions to completely disconnect the sub from the packer body 10, allowing the tubular string D and the tubing tester A to be elevated and removed completely from the well casing C.

The tubing tester portion A of the apparatus disclosed in Figs 1 to 7 may be used by itself, if desired, or in connection with other apparatus than the specific well packer B disclosed in the drawings. Some other apparatus might embody elements therein for resisting rotation of the lower tubular member 36, in which event it would be unnecessary to provide the friction drag device 60.

In the form of invention disclosed in Figs. 8, 9, and 10, similar results are secured, as was described in connection with the other form of invention. Thus, a lower tubular member 36d is piloted within the lower housing portion 37c of an upper tubular member 37d, this lower housing portion being threadedly secured to an upper housing portion 37e threadedly attached to the lower end of a tubular string D extending to the top of the well bore. The lower end of the housing 37c has an inwardly directed flange 51a extending under the lower shoulder 38b of the head 38c to retain the parts in appropriate assembled relation. This head has an axial passage 41a extending through its upper wall 39a offset to one side of the axis of the upper and lower members 37d, 36d.

The upper housing portion 37e has a ball containing passage 43a offset with respect to the common axis of the upper and lower tubular members 37d 36d, and this particular passage is adapted to receive or contain a valve element 29, which may be in the form of a ball. The passage 41a in the head 38c and the inlet passage 43a through the upper housing portion 37e are either aligned with each other or disaligned from each other. When disaligned from each other, the ball 29, contained within the inlet passage 43a cannot drop down through the head passage 41a, which has a larger diameter than the ball. Instead, the lower end of the ball 29 engages the upper end of the head 38c, and when so engaged the lower end of the ball is in sealing contact with an encompassing seal ring 70 surrounding the passage 43a and secured to the housing portion by a suitable clamp nut 71 threaded into the lower portion of the upper housing member 37e. When the passages 43a, 41a are disaligned, and the ball 29 engages the upper end of the lower tubular member head 38c, fluid cannot be pumped down the tubular string D and upper housing portion 37e, since the engagement of the ball with the upper end of the head and with the seal ring 70 precludes the fluid from flowing past the ball valve element 29 (Fig. 8).

The location of the passages 43a, 41a in or out of alignment with each other is determined by a suitable locating and stop device provided in the upper and lower tubular members 37d, 36d. Thus, the upper wall 39a of the head 38c is provided with an arcuate opening 72 in which the head 73 of a cap screw 74 is received, the screw being threaded upwardly into the upper housing portion 37e. When the cap screw head 73 engages one end 75 of the wall 39a defining the arcuate opening 72, the passages 43a, 41a are out of alignment from one another, being disposed in the position shown in Fig. 8, in which the tubing string D can be tested. However, upon rotating the upper tubular member 37d relative to the lower tubular member 36d, the screw 74 is movable freely in the opening 72 until it engages the opposite end 76 of the wall arcuate opening 72. When this engagement occurs, the passages 43a, 41a are in alignment with each other, as disclosed in Fig. 9, allowing the ball 29 to be ejected down through the head passage 41a for continued downward movement through the lower tubular member 36d either into engagement with a companion valve seat 27 in a lower packer B, such as shown in Fig. 1, or for complete ejection from the apparatus.

To prevent inadvertent rotation between the upper and lower tubular members 37d, 36d until desired, the lower tubular member head 38c is initially disposed in an upper position within the housing 37d, to cause the head 73 of the cap screw 74 to be disposed in a counterbore or enlarged recess 77 in the lower member head. The parts are held in this position by a suitable shear screw 78 interconnecting the lower housing portion 37c and the lower member head 38c. When in this position, the lower shoulder 38b of the head is disposed above the housing flange 51a. When the parts are in this position, the axes of the passages 43a, 41a are out of alignment with each other, the ball 29 engaging the upper end of the head 38c and being in sealing engagement with the seal ring 70, allowing the tubular string to be pressure tested.

During the lowering of the apparatus through the fluid in the well bore, the ball 29 can be elevated by the pressure out of engagement with the seal ring 29 and out of the inlet passage 43a, allowing the fluid to by-pass around the ball and flow upwardly into the tubular string D. When a pressure test is to occur, the fluid in the tubular string is subjected to pressure, which will move the ball 29 downwardly, the ball being guided into the inlet 43a by the tapered surface 79 in the upper housing portion at the upper end of the inlet, the ball passing into the inlet and into engagement with the upper end of the head 38c in sealing engagement with the seal ring 70.

When it is desired to release the ball, the tubular string D is elevated, the friction drag device or other device associated with the lower tubular member 36d resisting upward elevation of the latter. The shear screw 78 is disrupted, to allow the housing 37d to move upwardly with respect to the lower tubular member 36d to the extent determined by engagement of the flange 51a with the lower end 38b of the head 38c. Such relative elevation moves the head 73 of the cap screw out of the counterbore 77 in the lower member head, allowing the tubular string D to be turned, as to the right, to rotate the housing 37d and the ball 29 with respect to the lower tubular member 36d, until the cap screw head 73 engages the other end 76 of the arcuate opening 72, which places the inlet passage 43a in communication with the outlet passage 41a. When this occurs, the ball 29 can be pumped out of the seal ring 70 and through the outlet passage 41a for continued downward movement through the lower tubular member 36d.

To insure against leakage of fluid from the housing 37d, a suitable seal ring 80 may be provided in a groove 81 in the head engaging the inner wall 57a of the lower housing member. Similarly, a thread seal ring 82, may be provided in a groove 83 in the upper housing portion 37e and engaging the wall 57a of the lower housing portion 37c.

In the form of invention disclosed in Figs. 11 to 14, inclusive, the lower tubular member head 38e has an outlet passage 41b disposed coaxial of the tubular members 37f, 36f, and also coaxial of an inlet passage 43b in the lower portion of the upper housing member 37g and which contains the seal ring 70a and ball valve element 29. The ball valve element 29 cannot move downwardly, at first, because of the location of a slide block 90 thereunder. This slide block has a passage 91 located initially to one side of the passages 43b, 41b through the housing 37f and the head 38e of the lower tubular member 36f. The slide block 90 can be shifted transversely of the housing 37f and lower head 38e to place its passage 91 in alignment with the other two passages 43b, 41b, whereupon the ball 29 is ejectable down through the aligned passage 91, 41b, for continued downward movement through the lower tubular member 36f.

The position of the slide block 90 is dependent upon the relative arcuate position between the housing 37g and the lower tubular member 36f. Rotation of the housing with respect to the lower tubular member will effect the transverse shifting of the slide block 90. As disclosed a cam actuator segment 92 is secured to the lower end of the upper housing portion 37g, as by means of welding material 93. This cam actuator or cam ring 92 is provided with an inner eccentric or cam surface 94 engageable with cam follower surfaces 95, 96 at opposite portions of the slide block 90. When the slide block 90 is disposed in the position that prevents the ball 29 from moving down out of sealing engagement with the seal ring 70a, as shown in Figs. 11 and 13, it is held in this position by a shear screw 97 connecting the lower housing member 37h to the head 38e of the lower tubular member 36f. This position is determined by the engagement of a transverse lug 98 on the slide block with a stop surface 99 on the cam ring 92, which prevents the cam ring from being rotated in one direction (as in a counter-clockwise direction as shown in Fig. 13) with respect to the slide block 90.

The slide block is guided in its transverse movement by being received within a transverse diametrically disposed groove 100 in the upper portion of the lower member head 38e, the lower portion of the slide block having parallel sides 101 adapted to slide along the side walls 102 of the head groove 100. It is the upper portion 90a of the slide block which is associated with the cam or eccentric ring segment 92. The sliding of the block 90 in one direction is prevented by engagement of one of its cam surfaces 95 with the eccentric surface 94 on the ring 92, its movement in the opposite direction being prevented by engagement of an end surface 103 of the lug with a companion stop shoulder 104 formed on the cam ring, as is evident from an inspection of Fig. 13. As stated above, when the parts are in the position just described, the axis of the block passage 91 is offset with respect to the common axis of the other passages 43b, 41b, the ball 29 engaging the upper surface of the block 90 and being held thereby in sealing relation to the seal ring 70a secured to the upper housing portion 37g around the passage 43b.

With the parts in the position just described, the tubular string D can be pressure tested as often as is deemed necessary. During downward movement of the tubular string in the apparatus through the fluid in the well casing or well bore, the fluid can flow through the head passage 41b and block passage 91, shifting the ball 29 in an upward direction from its companion seal 70a, to allow the fluid to flow through the upper portion of the housing 37g and into the tubular string D thereabove. When the tubular string is to be pressure tested, the fluid in the tubular string is subjected to pressure, which shifts the ball 29 downwardly, the ball engaging the tapered guide surface 79a at the entry to the housing passage 43b, which guides the ball into the latter, the ball entering this passage and moving down therein in engagement with the upper end of the slide block 90, in which position it will be surrounded and sealingly engaged by the seal ring 70a. Pressure may be applied to the fluid in the tubular string, the fluid being incapable of by-passing the ball 29 because of its sealing engagement with the seal ring 70a.

Whenever it is desired to eliminate the ball valve member 29, to secure the downward flow of fluid through the tubular string D, and the pressure testing apparatus, the lower tubular member 36f is held from rotation by any suitable device, such as the drag device 60 illustrated in Figs. 1 and 2, such drag device providing enough resistance to turning of the lower tubular member to enable the screw 97 to be sheared. Following such shearing, the housing 37f is rotated, to cause the cam ring 92 secured thereto to shift angularly with respect to the slide block 90, which is prevented from rotating by reason of its confinement within the transverse head groove 100. During the first part of the rotation of the housing 37f and its cam ring 92, the end stop 104 is removed from the path of the slide block, the eccentric cam surface 94 of the cam ring engaging the follower surface 95 on the slide block to shift the latter transversely of the housing 37g and the lower tubular member head 38e, the direction of shifting being to the left in Figs. 11 and 13. The block 90 continues its movement to the left upon rotation of the cam ring until the eccentric cam surface 95 engages the opposite follower surface 96 of the block 90 and the end of the ring moves into engagement with the locating lug 98 on the block (Fig. 14). When such engagement occurs, further relative rotation between the housing 37f and its cam ring 92 with respect to the block 90 and the lower tubular member 36f cannot occur, the block being prevented from shifting to the left to a further extent by virtue of the engagement between the cam surface 94 and follower surface 96, the right hand portion of the cam surface 94 and the first-mentioned follower surface 95 also still being in engagement, to prevent movement of the block in the opposite direction. When the end of the cam ring 92 engages the locating lug 98 on the block, as shown in Fig. 14, the passage 91 through the block is coaxial of the other two passages 43b, 41b, which allows the ball valve element 29 to be pumped or shifted downwardly out of engagement from the seal ring 70a, passing through the block passage 91 and lower tubular member head passage 41b for downward movement through the lower tubular member 36f.

The inventor claims:

1. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to communicate with each other; means for preventing downward flow of fluid from said upper member passage to said lower member passage, comprising a valve member adapted to be disposed in said upper member passage and a companion member engaging said valve member to prevent downward movement of said valve member from said upper member passage; and means responsive to rotation of said upper member with respect to said lower member for shifting said companion member and valve member with respect to each other to permit said valve member to move into and through said lower member passage to allow such downward flow of fluid.

2. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to communicate with each other; means for preventing downward flow of fluid from said upper member passage to said lower member passage, comprising a valve member adapted to be disposed in said upper member passage and means on said lower member engaging said valve member to prevent said valve member from moving downward out of said upper member passage; and means responsive to rotation of said upper member with respect to said lower member for relatively shifting said valve member and preventing means to permit said valve member to move down out of said upper passage and into said lower member passage to allow such downward fluid flow.

3. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to communicate with each other; means for preventing downward flow of fluid from said upper member passage to said lower member passage, comprising a valve member adapted to be disposed in said upper member passage and a companion member engaging said valve member to prevent downward movement of said valve member from said upper member passage, said valve member being movable upwardly in said upper member passage to allow upward flow of fluid therethrough; and means responsive to rotation of said upper member with respect to said lower member for shifting said companion member and valve member with respect to each other to permit said valve member to move into and through said lower member passage to allow such downward fluid flow.

4. In combination: a well packer apparatus embodying means for hydraulically setting the packer apparatus in a well bore and a valve seat; upper and lower tubular members disposed one within the other and rotatable with respect to each other; said lower tubular member being secured to said packer apparatus and said upper tubular member being adapted to be secured to a tubular string; said tubular members having fluid passages therein adapted to communicate with each other; means for preventing downward flow of fluid from said upper member passage to said lower member passage, comprising a valve member adapted to be disposed in said upper member passage and a companion member engaging said valve member to prevent downward movement of said valve member from said upper member passage; and means responsive to rotation of said upper member with respect to said lower member for shifting said companion member and valve member with respect to each other to permit said valve member to move into and through said lower member passage and into engagement with said valve seat to enable fluid pressure to be developed in said well packer apparatus to set the same.

5. In apparatus for pressure testing a tubular string to be disposed in a well bore: upper and lower tubular members disposed one within the other and rotatable with respect to each other; means on said upper tubular member for attaching said upper tubular member to the tubular string; said lower member having a pair of fluid passages therein; said upper member having a fluid passage therein; said lower member passages communicating with each other below said upper member passage; a valve member in said upper member passage movable downwardly into engagement with one of said lower member passages to close said one passage while said upper member is disposed across and closes said other lower member passage; and stop means on said tubular members engaging each other upon rotation of said upper member relative to said lower member to locate said upper member passage and valve member in alignment with said other lower member passage to allow said valve member to pass downwardly into and through said other lower member passage.

6. In apparatus for pressure testing a tubular string to be disposed in a well bore: upper and lower tubular members disposed one within the other and rotatable with respect to each other; means on said upper tubular member for attaching said upper tubular member to the tubular string; said lower member having a pair of fluid passages therein; said upper member having a fluid passage therein; said lower member passages communicating with each other below and said upper member passage; a valve member in said upper member passage movable downwardly into engagement with one of said lower member passages to close said one passage while said upper member is disposed across and closes said other lower member passage; said valve member being movable upwardly out of engagement from said one passage to allow upward flow of fluid through said one passage and upper member passage; and stop means on said tubular members engaging each other upon rotation of said upper member relative to said lower member to locate said upper member passage and valve member in alignment with said other lower member passage to allow said valve member to pass downwardly into and through said other lower member passage.

7. In apparatus for pressure testing a tubular string to be disposed in a well bore: upper and lower tubular members disposed one within the other and rotatable with respect to each other; means on said upper tubular member for attaching said upper tubular member to the tubular string; said lower member having a pair of fluid passages therein; said upper member having a fluid passage therein; said lower member passages communicating with each other below said upper member passage; a ball valve member in said upper member passage movable downwardly into engagement with one of said lower member passages to close said one passage while said upper member is disposed across and closes said other lower member passage; said other lower member passage having a greater diameter than the diameter of said ball valve member; and stop means on said tubular members engaging each other upon rotation of said upper member relative to said lower member to locate said upper member passage and ball valve member in alignment with said other lower member passage to allow said ball valve member to pass downwardly into and through said other lower member passage.

8. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to communicate with each other; means for preventing downward flow of fluid from said upper member passage to said lower member passage, comprising a valve member adapted to be disposed in said upper member passage and a companion member engaging said valve member to prevent downward movement of said valve member from said upper member passage; means responsive to rotation of said upper member with respect to said lower member for shifting said companion member and valve member with respect to each other to permit said valve member to move into and through said lower member passage to allow such downward flow of fluid; and friction drag means on said lower tubular member frictionally engageable with the wall of a well casing for resisting rotation of said lower tubular member.

9. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to communicate with each other; a valve member engageable with said lower tubular member and disposed in said upper member passage; seal means in said upper tubular member engaging said valve member when disposed in said upper member passage to prevent downward flow of fluid in said upper member passage; rotation of said upper member with respect to said lower member enabling said valve member to disengage from said lower tubular member and move from said upper member passage into and through said lower member passage.

10. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to be located in alignment with each other and out of alignment with each other; means for preventing flow of fluid between said passages when out of alignment with each other, comprising a valve member adapted to be disposed in said upper member passage to prevent downward flow of fluid from said upper member passage into said lower member passage; and stop means on said tubular members engageable with each other upon rotation of said upper member relative to said lower member to locate said upper member passage and valve member in alignment with said lower member passage to allow said valve member to pass downwardly into said lower member passage.

11. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to be located in alignment with each other and out of alignment with each other; a valve member adapted to be disposed in said upper member passage and prevented from moving downwardly out of said upper member passage by engaging said lower tubular member; seal means in said upper tubular member engaging said valve member when disposed in said upper member passage to prevent downward flow of fluid in said upper member passage; and stop means on said tubular members engageable with each other upon rotation of said upper member relative to said lower member to locate said upper member passage and valve member in alignment with said lower member passage to allow said valve member to pass downwardly into said lower member passage.

12. In apparatus for pressure testing a tubular string to be disposed in a well bore: upper and lower tubular members disposed one within the other and rotatable with respect to each other; means on said upper tubular member for attaching said upper tubular member to the tubular string; said tubular members having fluid passages therein adapted to be located in alignment with each other and out of alignment with each other; a valve member adapted to be disposed in said upper member passage and prevented from moving downwardly out of said upper member passage by engaging said lower tubular member; seal means in said upper tubular member engaging said valve member when disposed in said upper member passage to prevent downward flow of fluid in said upper member passage; stop means on said tubular members engageable with each other upon rotation of said upper member relative to said lower member to locate said upper member passage and valve member in alignment with said lower member passage to allow said valve member to pass downwardly into said lower member passage; and releasable retaining means on said tubular members for preventing relative rotation between said tubular members to hold said passages out of alignment with each other.

13. In apparatus for pressure testing a tubular string to be disposed in a well bore: upper and lower tubular members disposed one within the other; means on said upper tubular member for attaching said upper tubular member to the tubular string; said tubular members having fluid passages therein adapted to communicate with each other; a valve member adapted to be disposed in said upper member passage to close said upper member passage; a holding member engageable with said valve member to prevent its downward movement from said upper member passage; and coengaging means on said holding member and one of said tubular members for shifting said holding member out of engagement with said valve member upon rotation of said upper tubular member relative to said lower tubular member to allow said valve member to move downward into said lower member passage.

14. In apparatus for pressure testing a tubular string to be disposed in a well bore: upper and lower tubular members disposed one within the other; means on said upper tubular member for attaching said upper tubular member to the tubular string; said tubular members having fluid passages therein adapted to communicate with each other; a valve member adapted to be disposed in said upper member passage to close said upper member passage; a holding member movable transversely on said lower tubular member and engageable with said valve member to prevent its downward movement from said upper member passage; and coengaging means on said holding member and upper tubular member for shifting said holding member transversely of said lower tubular member out of engagement with said valve member upon rotation of said upper member relative to said lower member to allow said valve member to move downward into said lower member passage.

15. In apparatus for pressure testing a tubular string to be disposed in a well bore: upper and lower tubular members disposed one within the other; means on said upper tubular member for attaching said upper tubular member to the tubular string; said tubular members having aligned fluid passages therein; a valve member adapted to be disposed in said upper member passage to close said upper member passage; a holding member adapted to be disposed at least partially across said aligned passages for engagement with said valve member to prevent downward movement of said valve member from said upper member passage; and coengaging means on said holding member and one of said tubular members for shifting said holding member out of alignment with said passages and out of engagement with said valve member upon rotation of said upper tubular member relative to said lower tubular member to allow said valve member to move downwardly into said lower member passage.

16. In apparatus for pressure testing a tubular string to be disposed in a well bore: upper and lower tubular members disposed one within the other; means on said upper tubular member for attaching said upper tubular member to the tubular string; said tubular members having aligned fluid passages therein; a valve member adapted to be disposed in said upper member passage to close said upper member passage; a holding member between said passages having a passage, said holding member being engageable with said valve member when said holding member passage is out of alignment with said tubular member passages to prevent downward movement of said valve member from said upper member passage; and coengaging means on said holding member and one of said tubular members for shifting said holding member to a position in which its passage is in alignment with said tubular member passages, upon rotation of said upper tubular member relative to said lower tubular member, to allow said valve member to move downwardly from said upper member passage through said holding member passage into said lower member passage.

17. In apparatus for pressure testing a tubular string to be disposed in a well bore: upper and lower tubular members disposed one within the other; means on said upper tubular member for attaching said upper tubular member to the tubular string; said tubular members having aligned fluid passages therein; a ball valve member adapted to be disposed in said upper member passage to close said upper member passage; a holding member between said tubular members engageable with said ball valve member to prevent its downward movement from said upper member passage, said holding member having a passage therethrough; said ball valve member having a diameter less than the diameters of all of said passages; and coengaging means on said holding member and one of said tubular members for shifting said holding member to a position in which its passage is aligned with said tubular member passages, upon rotation of said upper tubular member relative to said lower tubular member, to allow said ball valve member to move downward from said upper member passage through said holding member passage and into said lower member passage.

18. In apparatus for pressure testing a tubular string to be disposed in a well bore: upper and lower tubular members disposed one within the other; means on said upper tubular member for attaching said upper tubular member to the tubular string; said tubular members having aligned fluid passages therein; a ball valve member adapted to be disposed in said upper member passage to close said upper member passage; a holding member between said tubular members engageable with said ball valve member to prevent its downward movement from said upper member passage, said holding member having a passage therethrough; said ball valve member having a diameter less than the diameters of all of said passages; and coengaging cam means on said upper member and holding member for shifting said holding member transversely of said upper and lower members to a position in which said holding member passage is aligned with said tubular member passages to allow said ball valve member to move downward from said upper member passage through said holding member passage into said lower member passage.

References Cited in the file of this patent

UNITED STATES PATENTS

| | | |
|---|---|---|
| 2,204,648 | Baker | June 18, 1940 |
| 2,304,303 | Ferguson | Dec. 8, 1942 |
| 2,461,727 | Gardner | Feb. 15, 1949 |
| 2,555,627 | Baker | June 5, 1951 |